Patented Jan. 10, 1933

1,893,744

UNITED STATES PATENT OFFICE

COULTER W. JONES, OF SHREVEPORT, LOUISIANA, ASSIGNOR TO JONES CHEMICAL COMPANY, OF McDADE, LOUISIANA, A CORPORATION OF LOUISIANA

TREATING BRINES

No Drawing. Application filed March 20, 1931. Serial No. 524,213.

The present invention relates to the treatment of natural brines and the like, particularly such as contain bromine or iodine, which occur in some oil-producing fields, notably in Louisiana and California.

The aforesaid chemical elements, which are normally present in the brine in combined form as bromide or iodide, may be extracted by oxidizing the brine to liberate the halogen in the elemental state, and then separating the latter from the aqueous medium by any one of various methods known to the art. The brines in question, however, frequently contain, or are accompanied by, organic matter including oily or tarry substances as well as gaseous products the presence of which interferes with the extraction of the bromine or iodine, for instance, by combining with a portion of the free halogen to form halogenated derivatives which cannot be recovered according to the methods employed for recovering the free halogen. In any event, the bromine or iodine product of the process must be separated from the impurities due to the aforesaid organic substances, thus entailing additional treatment and expense. I have now found that substantially all of the difficulties due to the presence of the aforesaid impurities may be avoided by appropriate treatment of the brine to remove the same prior to liberating the free halogen therein. The invention, then, consists of the steps hereinafter fully described and particularly pointed out in the claims, the following description setting forth but a few of the ways in which the principle of the invention may be applied.

One method of extracting bromine or iodine from natural waters and the like, which normally have an exceedingly low content of such halogens, consists in liberating the halogen in the free state of oxidizing or electrolyzing the solution and then separating the free halogen from the solution by contacting the same with activated carbon or charcoal which absorbs the halogen and from which the latter may be recovered by various methods. In the presence of organic substances there is a tendency to form halogenated derivatives by reaction with the free halogen. This tendency, I have found, is greatly increased when activated carbon or charcoal is employed as an absorbing medium, the carbon apparently acting as a catalyst to promote the halogenation reaction. This not only leads to a material loss of bromine or iodine, but also may impair the activity of the carbon or charcoal by clogging the pores with the halogenated compounds.

I have now found that the aforesaid organic substances may be removed by first treating the brine containing the same with an absorbent or adsorbent material therefor and separating the purified brine from the solid material by decanting or filtering before liberating the halogen therein. The subsequent steps of liberating the halogen and recovering the same from the solution may then be carried out without any loss or hindrance due to the presence of the organic impurities, hence the maximum recovery of desired halogen is made possible. Any of the usual absorbent materials employed for clarifying or decolorizing aqueous solutions may be adapted to the present purpose, for example charcoal or other form of absorbent carbon, siliceous earths, precipitated silica, aluminum hydrate, silica gel or metallic oxide gels, etc.

Natural brines of the type here in question normally have an alkaline reaction, and must be acidified before bromine or iodine may be liberated therefrom in the elemental state. Such acidification may be done either before or after treatment of the brine to remove organic impurities therefrom.

The removal of the aforesaid impurities by treatment with an absorbing agent therefor may be carried out in a variety of ways. For instance, the raw brine, either before or after acidification, may be caused to flow through a bed of granular charcoal or other absorbent material, the depth of such bed and the rate of flow of the brine being so proportioned that a clear effluent is obtained substantially free from the impurities referred to. When the absorbing agent becomes clogged or saturated with absorbed material it may be revivified in any suitable way, such as by burning, roasting, steaming, extracting with a solvent for the impurities, etc. In some cases, if a sufficiently inexpensive absorbing agent is obtainable, the used absorbent may be discarded instead of revivifying the same, the choice of method of disposal, of course, being governed by economic considerations. In practice I have found that ordinary wood charcoal is a satisfactory and inexpensive absorbent for the impurities.

Another method of treatment consists in agitating the raw or acidified brine with a finely divided or powdered charcoal or other absorbent and then filtering through sand, or in any other convenient way.

After such preliminary treatment of the brine to remove organic impurities therefrom, the purified brine may then be processed by any of the known methods for the extraction of bromine or iodine, or both. For example, the purified brine, after having been acidified if necessary, is treated with chlorine in amount sufficient to liberate the bromine or iodine. The solution containing the free bromine or iodine is then contacted in any suitable way with a body of adsorbent material capable of adsorbing the halogen therefrom, such as activated carbon or charcoal, whereby such halogen is removed from the solution by adsorption upon such carbon or charcoal. The latter, when saturated, is separated from the aqueous solution and treated to recover the halogen therefrom. A preferred method therefor, particularly when iodine is the substance to be recovered, consists in treating the iodine-saturated charcoal with superheated steam at a temperature of 200° to 300° C. to volatilize the iodine from the charcoal, condensing the vapors and separating solid iodine from the aqueous condensate, as described in a patent application of L. C. Chamberlain, Serial No. 519,696, filed March 2, 1931.

The utility of the present invention has been especially demonstrated in the commercial production of iodine from a natural brine of the type hereinbefore referred to containing organic impurities, utilizing the general method just referred to. When such brine is processed directly by acidifying, chlorinating and adsorbing the liberated iodine upon active charcoal, the yield of iodine falls far short of the theoretical. Whereas the original brine may contain 40 to 50 parts per million of iodine, the amount recovered is but a fraction of that. This is accounted for by the chemical combination of iodine with organic matter present to form organic iodine compounds which are not recoverable by the usual methods of treatment for recovering iodine. Such chemical combination is not appreciable at ordinary temperatures unless active carbon or charcoal is present, which seem to act as catalysts for the reaction. In order to be able to use active charcoal for adsorbing the iodine, therefore, it is necessary to take measures to prevent or avoid the losses due to the cause just mentioned.

When the raw brine, either before or after acidification, is treated in the manner hereindescribed to remove organic impurities therefrom before the iodine is liberated, however, I have found that a substantially quantitative recovery of the iodine is possible. The trifling cost of the added treatment is offset many times over by the greatly increased yield of iodine obtained. Another advantage, as already indicated, is that the active charcoal employed for adsorbing the iodine from the solution is not fouled or clogged with organic matter, and is enabled to exert its maximum effectiveness for adsorbing iodine and, furthermore, may be used over again repeatedly without material loss of activity. Similar advantages accrue in case bromine, instead of iodine, is to be recovered according to the general procedure hereinbefore described. The preliminary treatment is also effective for removing hydrogen sulphide, which is also a frequently occurring impurity in brines of the type here in question and which must be disposed of before liberating the bromine or iodine, as the case may be.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of extracting bromine or iodine from a natural brine or the like containing such halogen in combined form and accompanied by organic impurities, wherein the halogen is liberated in the elemental state and then removed from the solution by adsorption upon an adsorbent medium therefor, the step which consists in contacting such brine with a body of absorbent material before liberating the halogen therein, such material being selected from the group consisting of charcoal, absorbent carbon, siliceous earth, precipitated silica, aluminum hydrate and metallic oxide gels.

2. In a method of extracting bromine or iodine from a natural brine or the like containing such halogen in combined form and accompanied by organic impurities, wherein the halogen is liberated in the elemental state and then removed from the solution by adsorption upon an adsorbent medium therefor, the step which consists in contacting such brine with a body of charcoal before liberating the halogen therein.

3. In a method of extracting bromine or iodine from a natural brine or the like containing such halogen in combined form and accompanied by organic impurities, wherein the halogen is liberated in the elemental state and then removed from the solution by adsorption upon an adsorbent medium therefor, the steps which consist in contacting such brine with a body of charcoal to absorb said organic impurities, separating the aqueous solution from the charcoal and then liberating the halogen in the solution.

4. In a method of extracting bromine or iodine from a natural brine or the like containing such halogen in combined form and accompanied by organic impurities, wherein the halogen is liberated in the elemental state and then removed from the solution by adsorption upon an adsorbent medium therefor, the steps which consist in acidifying such brine, contacting the same with a body of charcoal to absorb said organic impurities therefrom, separating the aqueous solution from the charcoal and then liberating the halogen in the solution.

Signed by me this 16th day of March, 1931.

COULTER W. JONES.